March 31, 1964    J. E. DEMING, SR    3,126,890
SURGICAL INSTRUMENT

Filed Oct. 22, 1962    2 Sheets-Sheet 1

JOHN E. DEMING SR.
INVENTOR.

BY Barnes & Seed

ATTORNEYS

March 31, 1964   J. E. DEMING, SR   3,126,890
SURGICAL INSTRUMENT
Filed Oct. 22, 1962   2 Sheets-Sheet 2
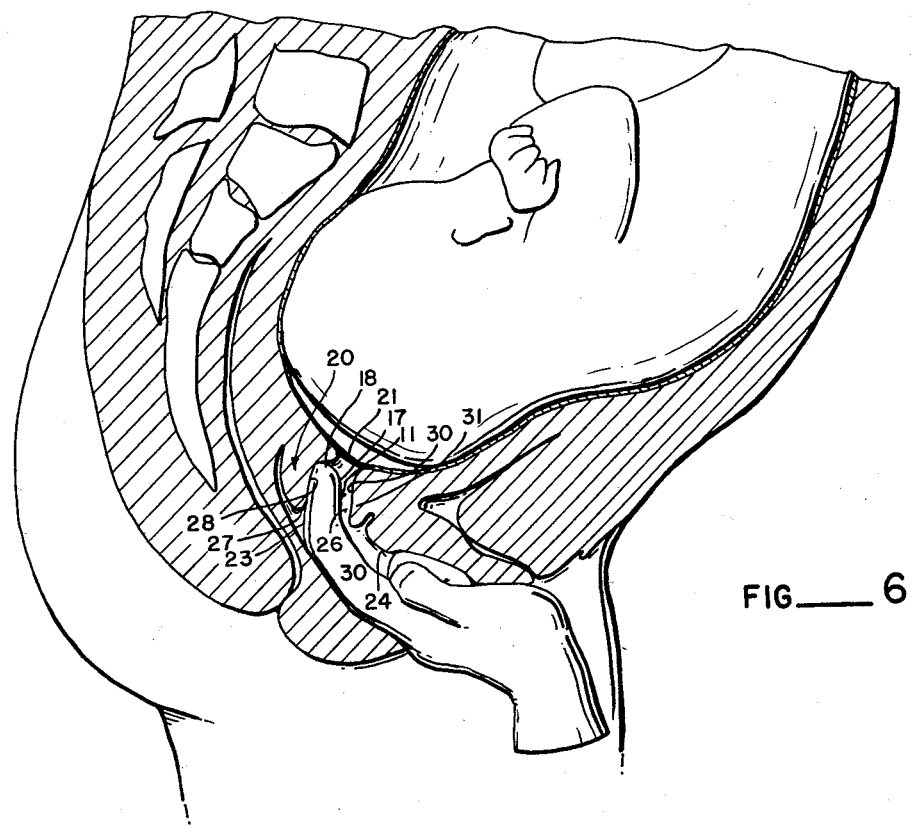
FIG. 6
FIG. 7
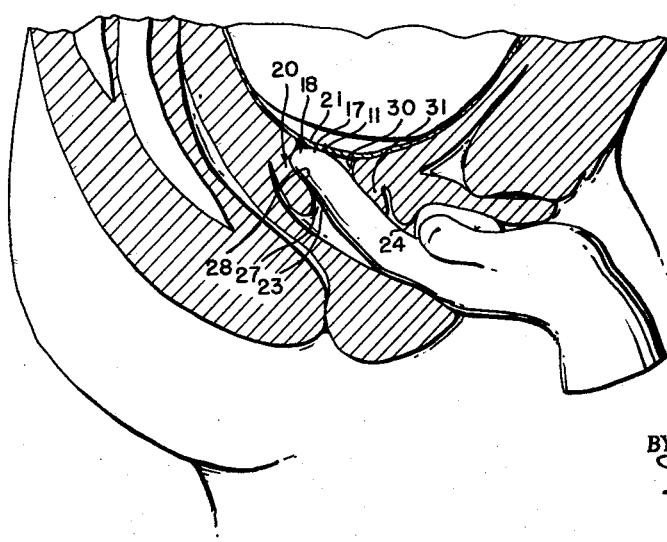
JOHN E. DEMING SR.
INVENTOR.
BY Barnes & Seed
ATTORNEYS United States Patent Office 3,126,890
Patented Mar. 31, 1964

3,126,890
SURGICAL INSTRUMENT
John Edmund Deming, Sr., 1012 Medical Arts Bldg.,
Tacoma, Wash.
Filed Oct. 22, 1962, Ser. No. 232,039
2 Claims. (Cl. 128—361)

This invention relates to a practice of obstetrics, and more particularly to an obstetrical device to artificially puncture the foetal membrane at the internal opening of the cervix to release the amniotic fluid which surrounds the baby in the uterus.

Frequently, the physician finds it necessary to *induce* (bring on or start) labor early by a mechanical physiological means, that is rupturing the foetal membranes. Also, often when labor has begun, the muscles which are contracting in an effort to expel the baby from the uterus may be ineffective to expel the baby because of the amount of amniotic fluid in the uterus. If it is medically indicated, the physician will artificially rupture the membrane covering the opening at the cervix to permit some of the fluid to be drained from the uterus so that the contracting muscles are able to push the baby through the cervical canal and vagina.

The Allis clamp, while not designed for the specific use of rupturing membranes, has been by far the most frequently used instrument in the United States for this purpose. In using the Allis clamp, the operator introduces two fingers, index and second finger, of one hand into the female cervical canal to function as a guide for the Allis clamp. With the other hand the operator manipulates the clamp in a manner to position the serrated tooth end of the Allis clamp between his two "guide" fingers. Then he attempts to punch, pick or prick the foetal membrane with the tooth end of the clamp. In order to accomplish this operation, the dilation of the cervical canal must be at least approximately three centimeters to permit the insertion of the guide fingers and the clamp therebetween.

However, there are many cases where the cervix has not dilated to a degree where the Allis clamp can be used, and yet where it is desirable that the foetal membrane be broken to release the fluid. For this reason other means have been devised to rupture this membrane where there is small cervical dilation, but their use has not been common because of the problem or "dangers" involved. One of the more serious problems is that it is difficult to puncture the membrane without penetrating into the uterus to the extent that the baby's head is injured. Another is that of accomplishing the entry through the vagina and the cervical canal without damaging the surrounding tissue and thus causing serious bleeding (this tissue being quite vascular during this period).

Of the prior art devices designed to accomplish the rupture of the membrane when there is little cervical dilation, those that provide a solely mechanical device to be inserted into the cervical canal, must by their nature be operated blindly, and hence these devices especially run a serious risk of penetrating into the uterus too deeply. Other devices have been provided which take the form of a finger attachment, with the finger itself being inserted with the device into the vagina and possibly the cervical canal. However, the construction of these prior art devices has often been such that they interfere with the sensitivity of the finger to the extent that the operator is unable to locate with sufficient accuracy the tooth or cutting portion of the device in relation to the membrane. Also some of the latter devices have been too cumbrous, with the result that the operator is not able to flex or manipulate his finger in a manner to bring the device into the desired operating position. In addition, there is the aforementioned difficulty that the cutting or abrading portion of such finger attachment devices is often so constructed that it not only interferes with the entry into the vagina and/or cervical canal, but often damages the tissue in making the entry.

It is with the foregoing considerations in mind that the present invention was devised, it being a general object of this invention to provide an obstetrical device to rupture the foetal membrane under conditions of minimal dilation of the cervix.

It is a more specific object to provide such a device in the form of a finger attachment which permits maximum flexibility of finger to which it is attached so that the operator can properly flex the finger and manipulate the device so as to bring the cutting portion of the device into proper engagement with the foetal membrane, which is so arranged that the operator is able to introduce both his finger and the device into the vagina and into the cervical canal without damaging the surrounding tissue, and which is so constructed that the operator is able first to bring his finger into sensitive contact with the foetal membrane and then bring the cutting or abrading tooth of the device into controlled engagement with the membrane so as to rupture the same with substantially no danger of injuring the head of the baby.

These and other more particular objects and advantages in view and which will appear and be understood in the course of the following description and claims, the invention consists in the novel construction and in the adaptation and combination of parts hereinafter described and claimed.

In the accompanying drawings:

FIG. 6 is a view similar to that of FIG. 5, in which is illustrated the manner in which an operator introduces the device into the cervical canal, and FIG. 7 is a view similar to that of FIG. 6 in which is illustrated the manner in which the operator pierces the foetal membrane after having made contact with the end portion of the finger.

Figure 1:
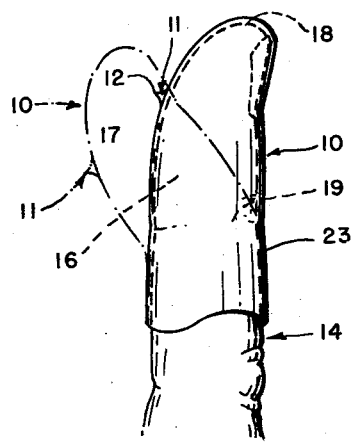
FIGURE 1 is a side elevational view of a first embodiment of my invention applied to the wearer's operating finger, the distal portion of this finger being shown in full and broken lines in its unflexed and flexed position, respectively, so as to illustrate more clearly the location of the puncturing tooth with respect to this distal finger portion.
Figure 2:
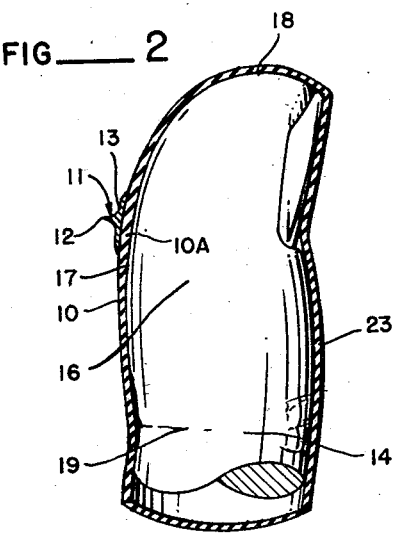
FIG. 2 is a view similar to that of FIG. 1, but with the device being shown in section along a plane coinciding with the longitudinal axis of the wearer's finger.
Figure 3:
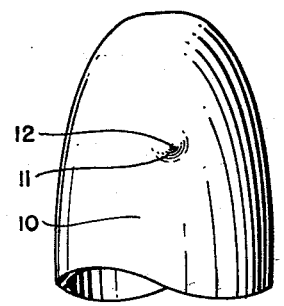
FIG. 3 is a perspective view of the first embodiment of my invention.

Referring to FIGS. 1–3, numeral 10 designates an upper finger covering portion of a surgical glove. It is to be understood that for simplicity of illustration only this upper finger covering portion is shown, but that this finger portion is integral with the rest of the glove, which is or may be made of rubber latex film or be a plastic throwaway type of glove and which desirably conforms closely to the shape of the wearer's hand. At the palm of the distal portion of this glove is a tooth 11, the projecting end of which is about 1–3 mm. from the distal palm, and is formed as a relatively sharp puncturing or abrading tip 12.

The base 13 of the tooth is moderately broad to present a surface sufficiently large so that the tooth can properly be galvanized or otherwise fixed to the glove portion 10, and also so that the tip 12 of the tooth will maintain its outwardly projecting position during the membrane puncturing operation. If desired, the glove portion immediately behind and proximate to the tooth may be thickened as at 10a to make this latter glove portion more rigid, so as to give stability to the tooth with respect to the operator's finger, shown at 14, when the tooth is performing its membrane puncturing function.

Desirably, this tooth is fixed to the glove portion which fits over the index finger, but it is also practical for this tooth to be placed in a similar manner on the middle finger portion of the glove. However, it is quite important, for reasons to be discussed hereinafter, that the tooth 11 (more precisely the tip 12 of the tooth) be properly located with respect to the distal portion 16 of the selected operating finger, and that the manner in which the tooth is fixed with respect to the distal portion be such that it does not interfere with the mobility or free movement of this distal portion or of the rest of the finger. The limits within which this tooth must be located will be understood more clearly in light of the discussion relating to the operation of this device, but it is sufficient at this point to indicate that the tooth must be located at the palm 17 of the distal portion of the operating finger and be spaced moderately from the end 18 of the operating finger and moderately beyond the joint 19 of the distal portion of the finger.

Figure 5:
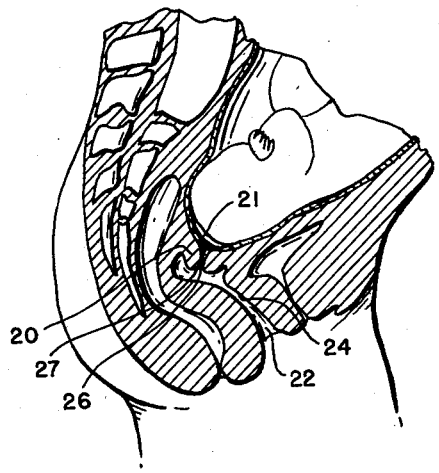
FIG. 5 is a sectional view of the female human anatomy carrying a child during pregnancy.

Proceeding now to a description of the operation of this device and referring specifically to FIGS. 5–7, the cervix 20 is illustrated as having dilated to only a moderate degree. Assuming now that it is medically indicated that the foetal membrane 21 should be broken, the operator, wearing the glove, inserts his operating finger 14 into the vagina 22, with the palm of the distal portion of the finger carrying the tooth 12 facing upwardly. (The terms, "back, front, upper, and lower," as used in describing the operation will be oriented with respect to the mother, "upper" designating proximity to the mother's head, "back" denoting proximity to the back of the mother, etc.) The back surface 23 of the finger is pressed downwardly in the vagina with moderate pressure so that the tip 12 of the tooth 11 is able to pass by the tissue 24 at the top of the vagina, without tearing or abrading this tissue. Also, the distal portion of the finger may be bent upwardly to a moderate extent to aid in protecting this tissue from damage.

It can be seen in FIG. 5 that the cervical canal 26 joins the vagina at approximately a right angle. When the end 18 of the operator's finger reaches the external opening 27 of the cervical canal, the distal portion 16 of the finger is bent upwardly so that the back end portion of the finger is pressed against the back surface 28 of the cervix at the cervical external opening 27. The distal portion 16 of the finger is then moved into the cervical canal, with the back side of the distal finger portion pressing against the back surface of the cervical canal in a manner to prevent the tooth 11 from tearing the tissue at the front surface 30 of the canal (see FIG. 6). This pressing against the back of the cervical canal also aids the operator to bend the distal finger portion to a position of angularity with respect to the rest of the finger so that this distal finger portion can properly move up and into the cervical canal, (this also being illustrated in FIG. 6).

The glove portion covering the tip 18 of the operating finger is sufficiently thin and flexible so that the operator can feel when his finger tip 18 has made contact with the foetal membrane 21. When such contact is made, the operator begins to straighten his finger to some degree and bend the distal portion back in a manner that the distal palm 17 is raised toward the membrane 21. The front portion 31 of the cervix fill yield sufficiently to permit this finger action (see FIG. 7).

During this straightening of the finger, the distal portion thereof remains in contact with the membrane 21, the area of contact moving from the tip of the finger down onto the distal palm. The operator, of course, is familiar with the precise location of the tooth 11 on his distal palm 17, and by maintaining contact with the membrane 21 by means of the distal finger portion, is able to orient the tooth very accurately with respect to the foetal membrane. When the tip 12 of the tooth 11 has made contact with the membrane 21 the operator moves his finger gently back and forth so as to puncture the membrane (as shown in FIG. 7). The angle to which the distal finger portion must be bent back so that the tooth can contact the membrane with sufficient pressure, will vary somewhat from case to case, but it is quite important that the movement from the distal joint be unrestricted to insure that proper contact can be made.

From the foregoing description of the operation of this device, it is apparent that the tooth 11 must be spaced a sufficient distance from the end 18 of the finger 14 so that the finger may enter the cervix and contact the membrane 21 without damaging the surrounding tissue or the baby. On the other hand, the tooth must be sufficiently close to the end of the finger so that as the distal portion is moved into the cervical canal, the tooth will not abrade the front portion 31 of the cervix, which would be the case if the tooth were located too far a distance below the end of the finger. Also the tooth must be sufficiently close to the end of the finger so that contact can be properly made with the membrane 21.

The tooth 11 may be made of any suitable material which will maintain a tip 12 of sufficient sharpness to puncture the membrane, and may be made of quite hard material, such as steel. However, the glove and the tooth 11 must be surgically clean; so the tooth, glove, and the manner of bonding the two should be such as to withstand the temperatures at which surgical instruments and the like are sterilized, and/or be such as to withstand "cold" or chemical sterilization.

Figure 4:
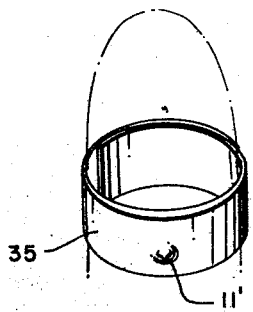
FIG. 4 is a perspective view of a second embodiment of my invention.

It is to be understood that my device may be made as an attachment to fit over a standard surgical glove, such as a "finger cot" to be rolled over the index finger or as the device shown in FIG. 4. The latter may be accomplished by bonding a tooth 11' to an adhesive strip 35, which then may be secured over the gloved operating finger in much the same manner as a conventional "Bandaid" is applied to a finger. The tooth 11', of course, would project outwardly from the adhesive strip 35. This may prove desirable, for example, if the operator wishes to locate the tooth at a precise position on the distal palm, depending upon the particular conditions of the obstetrical operation.

To insure that the operator have optimum control in operating the puncturing tooth, the tooth should receive its finger securing support from the distal portion of the finger. Thus the rubber glove should invest the distal portion of the operating finger with sufficient snugness so that the tooth will maintain its location with respect to the distal palm throughout the operation. If desired, other tooth support reinforcing means may be added to engage the distal finger portion more securely (e.g. making part of the glove thicker etc.). But if such additional support is provided, it should not extend over the end of the finger so as to inhibit the sensitivity of the tip 18 of the operating finger, nor should it extend beyond the distal joint 19 so as to interfere with the full flexibility of this distal portion of the operating finger.

It is thought that the invention will have been clearly understood from the foregoing detailed description of the illustrated preferred embodiment. Minor changes will suggest themselves and may be resorted to without departing from the spirit of the invention, wherefor it is my intention that no limitations be implied and that the hereto annexed claims be given a scope fully commensurate with the broadest interpretation to which the employed language admits.

What I claim is:

1. An obstetrical device for rupturing a membrane containing a fetus under conditions where there is a small dilation of an associated cervix, said device comprising a surgical glove composed of a thin, flexible material impervious to moisture and capable of withstanding sterilization by both heat and chemicals, said glove including a hand portion and five finger members connected thereto adapted to snugly fit around and enclose the hand of an operator during an obstetrical operation, each of said finger members including a palm portion that extends from the distal joint to the end of the operator's finger enclosed in the finger member, a rigid tooth including a substantially flat base and a tapered metal pin of one to three millimeters in length terminating in a point so that said pin will penetrate said membrane a sufficient distance for rupturing same without injury to the fetus in the membrane, said tapered pin extending substantially normal to said base, means securing the base of said pin to the center of the base of the tooth, means fixedly securing the tooth base to the palm portion of one of the middle finger members at a point that is located substantially midway between the ends of said palm portion, a portion of said palm portion between said tooth and its outer end being sufficiently thin and flexible so that the operator may feel the membrane with the extreme end of said one middle finger, the thickness of said palm portion adjacent said tooth being thicker than the material forming the remainder of said glove so as to adequately support said tooth, and the palms of all said finger members other than said one middle finger member having smooth exterior surfaces.

2. A device as defined in claim 1, wherein said base is circular and said point is round in cross section.

References Cited in the file of this patent

UNITED STATES PATENTS

| | | |
|---|---|---|
| 2,811,969 | Shubert | Nov. 5, 1957 |
| 2,847,012 | Eastman | Aug. 12, 1958 |
| 2,895,139 | Compton | July 21, 1959 |
| 3,062,212 | Kravitz et al. | Nov. 6, 1962 |

OTHER REFERENCES

Stein: "An Obstetric Ring for Artificial Puncture of the Membranes," J.A.M.A., Feb. 9, 1935, vol. 104, page 462.

Dogliotti et al.: "Surgical Treatment of Mitral Stenosis," from Surgery, May 1953, pages 646–647.